(12) United States Patent
McBain (10) Patent No.: US 8,063,303 B1
(45) Date of Patent: Nov. 22, 2011

(54) SAFETY ELECTRICAL OUTLET COVER

(75) Inventor: Theodore McBain, Reno, NV (US)

(73) Assignee: McBain Enterprises, LLC, Santa Clara, CA (US)

( * ) Notice: Subject to any disclaimer, the term of this patent is extended or adjusted under 35 U.S.C. 154(b) by 0 days.

(21) Appl. No.: 12/168,013

(22) Filed: Jul. 3, 2008

Related U.S. Application Data (60) Provisional application No. 61/050,540, filed on May 5, 2008.

(51) Int. Cl.
*H02G 3/14* (2006.01)
(52) U.S. Cl. ............. 174/67; 174/66; 439/142; 220/242
(58) Field of Classification Search .................... 174/66, 174/67; 220/241, 242; 439/142, 143, 136, 439/145
See application file for complete search history.

(56) References Cited

U.S. PATENT DOCUMENTS

| | | | | |
|---|---|---|---|---|
| 4,607,136 A | * | 8/1986 | Thomas | 174/67 |
| 4,857,004 A | * | 8/1989 | Poirier | 439/140 |
| 4,952,756 A | * | 8/1990 | Meyers | 174/67 |
| 5,078,614 A | * | 1/1992 | Shotey | 439/136 |
| 5,107,075 A | * | 4/1992 | Currier, Jr. | 174/67 |
| 5,932,845 A | * | 8/1999 | Lacy | 174/67 |
| 6,342,676 B1 | * | 1/2002 | Ha | 174/67 |

* cited by examiner

*Primary Examiner* — Dhirubhai R Patel
(74) *Attorney, Agent, or Firm* — Joshua Kaplan; Kaplan Law Practice, LLC (57) ABSTRACT

An electrical outlet safety cover for an electrical outlet that is attached to the outlet in place of traditional outlet covers. The outlet cover includes a slide that unlocks another slide containing holes that match prong holes on an outlet. Once the slide with the holes is moved into place, access to the outlet is granted and any electrical device can be plugged into the outlet.

16 Claims, 9 Drawing Sheets

SAFETY ELECTRICAL OUTLET COVER

CROSS-REFERENCE TO RELATED APPLICATIONS

This application claims priority to U.S. Provisional Patent Application Ser. No. 61/050,540, filed May 5, 2008, the entirety of which is incorporated by reference herein.

FIELD OF THE INVENTION

The present invention relates to an apparatus to make electrical outlets safer. Specifically, the present invention relates to an electrical outlet cover that helps keep young children from inserting foreign materials into an outlet.

BACKGROUND OF THE INVENTION

In residential and other structures, electrical outlets are generally positioned a short distance above the floor. This makes the outlets readily accessible to small children. A curious child is inclined to test and probe his environment and may stick objects, such as paper clips, for example, into the prong receiving openings of an electrical outlet. This exposes him to the danger of shock or even death.

Additionally, an exposed outlet present the problem of "carbon fires" that can occur when dust accumulates in an outlet.

In spite of generally widespread knowledge of the dangers that electrical outlets present to small children, very few devices are commercially available for denying a child access to an outlet. The most commonly available device is a small plastic disk with prongs that plug into the opening of an electrical outlet. The disk covers the holes of the outlet and takes the place of an electrical plug to prevent insertion of any other object in the openings. A major disadvantage of this type of device is that the disk may easily become lost or mislaid when it is temporarily removed to allow normal use of the outlet.

There have been a number of proposals for providing a permanently mounted safety cover for electrical outlets to make the prong receiving openings inaccessible to a child. Such proposals generally provide an inadequate solution either because the safety cover is too easily defeated by a child who is still too young to understand the dangers of electricity or because the covering device is unduly complicated and/or cumbersome.

It is desired to have an improved electrical outlet safety cover that avoids some of the problems of the prior art.

SUMMARY OF THE INVENTION

The present invention comprises a safety electrical outlet cover that prevents users from gaining access to the electrical outlet unless the cover is "unlocked". In addition, the present invention also comprises safety measures to ensure that the electrical outlet cover is properly installed before a user can plug a device into the electrical outlet.

In one exemplary embodiment of the present invention, an electrical outlet cover comprises a base, a face plate, two release slides, two receptacle slides, and a safety lock.

The release slides are pressed by a user, unlocking the receptacle slides. The receptacle slides may then be moved. The receptacle slides comprise apertures designed to match the shape of the apertures on an electrical outlet. Once the receptacle slides have been moved into position, the user will gain access to the electrical outlet through the apertures in the receptacle slides.

In accordance with other aspects of the present invention, a safety lock prevents a user from gaining access to the electrical outlet if the cover is not properly installed. The safety lock presses up against the electrical outlet. As the cover is being installed and fastened closer and closer to the outlet, the outlet forced the safety lock to lift out of its resting position. Once the safety lock has lifted high enough, the lock will allow the release slide to move and unlock the receptacle slide. If the cover has not been installed secure enough to the outlet, the safety lock will not lift high enough and will block the path of the release slide, thus ensuring that the receptacle slides will remain locked and no access to the outlet will be granted.

In other exemplary embodiments, the device may be designed to correspond to different types of outlets, such as, for example, decora style outlets.

For a more complete understanding of the nature and various advantages of the present invention, reference should be made to the ensuing detailed description and claims, taken in conjunction with the accompanying drawings.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION OF THE INVENTION

The present invention comprises an electrical outlet cover that blocks a person, particularly a young child, from inserting foreign matter into an electrical outlet. In the following description, numerous specific details are set forth in order to provide a more thorough description of the present invention. It will be apparent, however, to one skilled in the art, that the present invention may be practiced without these specific details. Other embodiments of the invention will readily suggest themselves to such skilled persons having the benefit of this disclosure. In some instances, well-known features have not been described in detail so as not to obscure the invention.

Figure 1:
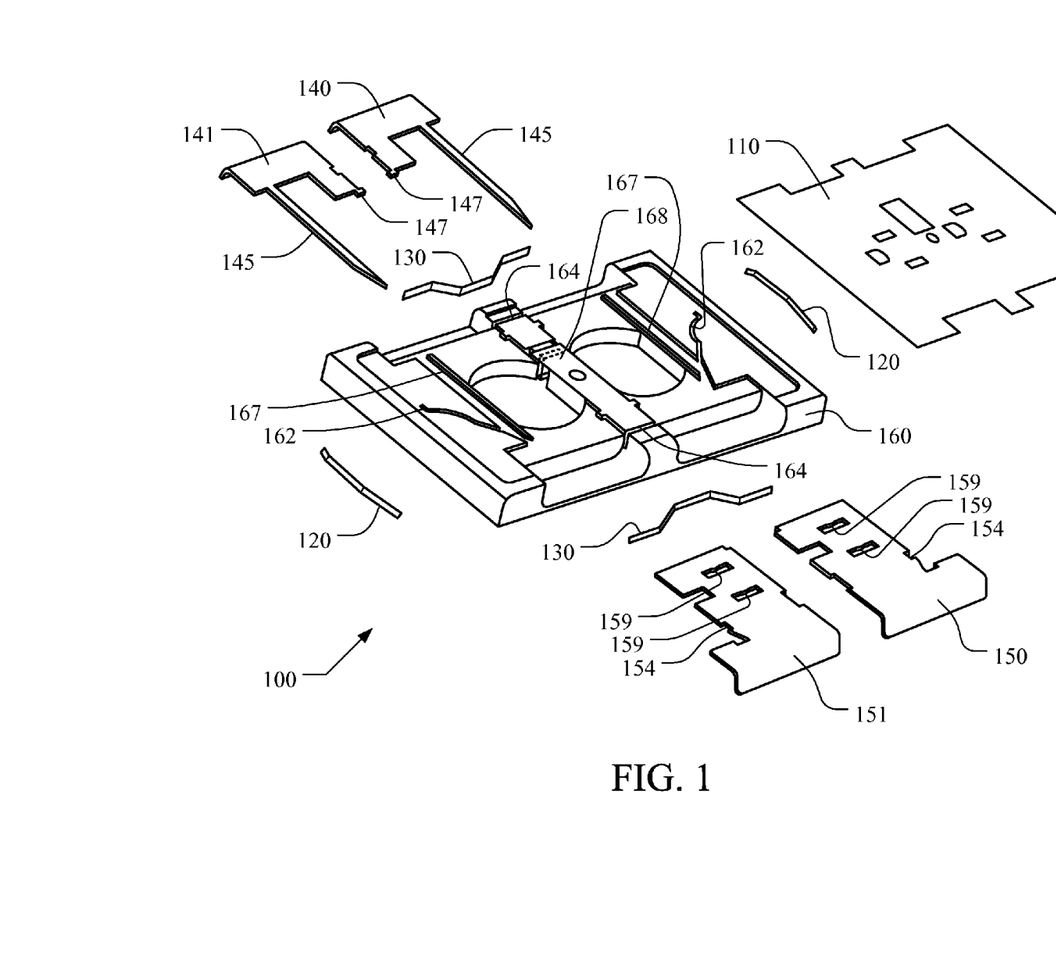
FIG. 1 is a schematic illustrating components of an exemplary embodiment in accordance with the present invention.

An exemplary embodiment of the present invention is shown in FIG. 1. FIG. 1 shows the different components of an electrical outlet cover in accordance with aspects of the present invention. The embodiment shown in FIG. 1 comprises a face plate 110, a base 160, two locking springs 120, two return springs 130, two release slides 140 and 141, and two receptacle slides 150 and 151.

The base 160 comprises locking spring channels 162, return spring channels 164, blocks 166, release prong channels 167, and safety lock 168.

During assembly of the exemplary embodiment of the present invention shown in FIG. 1, locking springs 120 are positioned into the locking spring channels 162. Similarly, return springs 130 are positioned in the return spring channels 164. Release slides 140 and 141 are placed into the base 160 from the side in which the release prongs 145 are able to be slid into release prong channels 167, as shown in FIG. 1. Receptacle slides 150 and 151 slide into the end of base 160 opposite of the release slides 140 and 141. In this particular embodiment shown, release slides 140 and 141 are positioned in a way such that release prongs 145 are positioned away from the center of the base. The receptacle slides 150 and 151 are positioned so that the apertures for the prongs line up with the prong holes in the outlet. Face plate 110 will rest on top of the base 160 and all of the other corresponding elements.

Figure 2:
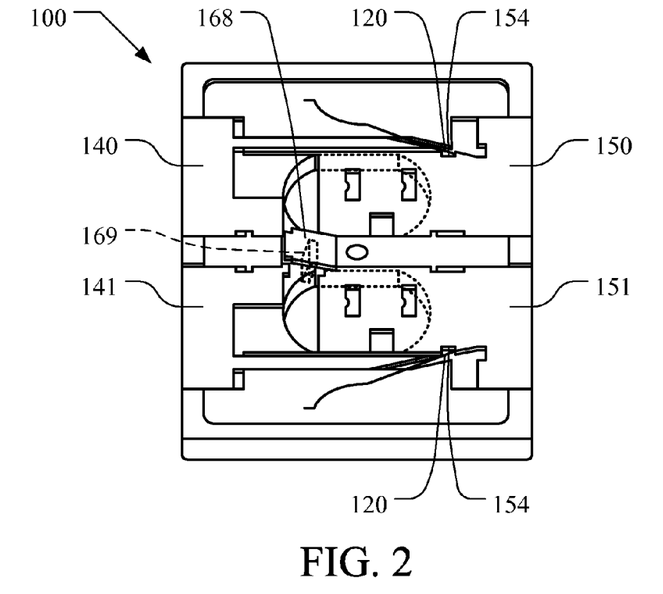
FIG. 2 is a schematic illustrating an exemplary embodiment of the present invention properly installed.

FIG. 2 shows an exemplary embodiment of the components described above assembled to make outlet cover 100. When the outlet cover 100 is assembled, the holes for the prongs on the electrical outlet will be covered by the electrical outlet cover 100. Thus, nothing will be allowed to be placed into the prong holes of the electrical outlet, including foreign items that could be potentially dangerous. As seen in this closed position, locking springs 120 as positioned in the locking spring channels 162 will prevent the receptacle slides 150 and 151 from moving and then allowing the prong holes in the electrical outlet to become exposed. The ends of the locking springs 120 are pressed against the receptacle slides 150 and 151 preventing the movement of the receptacle slides. The ends of the locking springs 120 are positioned in the locking spring grooves 154 of the receptacle slides 150 and 151.

Figure 3:
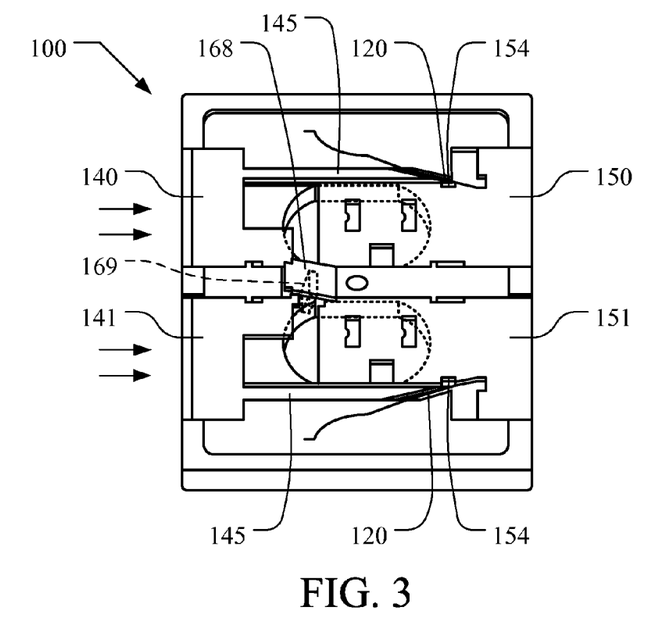
FIG. 3 is a schematic illustrating an exemplary embodiment of the present invention properly installed in use.

With reference to FIG. 3, to open the outlet cover, and therefore enable a person to insert a plug into the outlet, an individual must press the side of the outlet cover with release slides 140 and 141 first, as indicated by the arrows. That person should press on the release slides 140 and 141 directly. By pressing on the release slides 140 and 141, the release prongs 145 press against the locking springs 120. This force lifts the locking springs out of the locking spring grooves 154. This is demonstrated in FIG. 3.

With the locking springs 120 out of the way, the receptacle slides are free to move. The user should then press on the receptacle slides 150 and 151 while still pressing the release slides 140 and 141. The receptacle slides will then move into the outlet cover, revealing the prong holes of the electrical outlet. The user will then be able to plug the electrical plug into the outlet. This is demonstrated in FIG. 4.

It should be noted that FIGS. 1-4 demonstrate the usage of an exemplary embodiment of the present invention when the outlet cover 100 is installed to the outlet properly. FIG. 5 illustrates that a user would not be able to move the slides 140, 141, 150, and 151 if the outlet cover is not properly installed.

Figure 4:
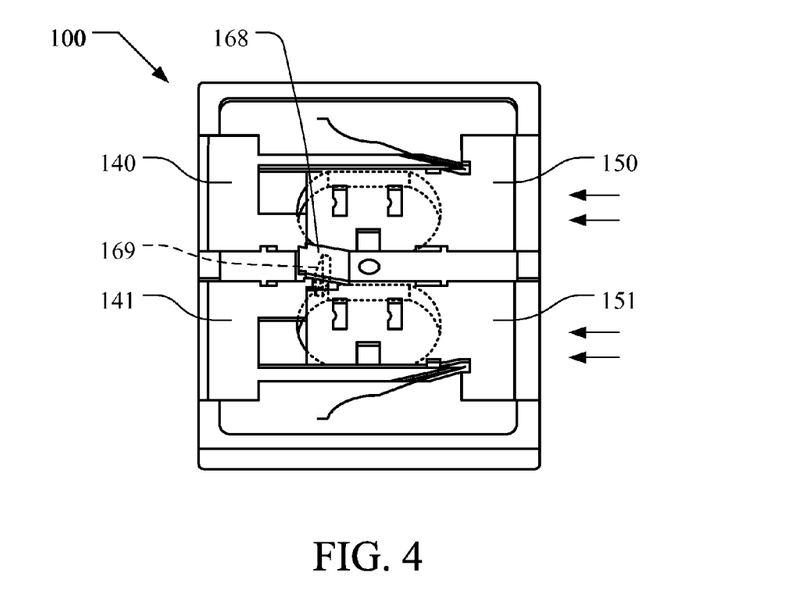
FIG. 4 is a schematic illustrating an exemplary embodiment of the present invention properly installed in use.
Figure 5:
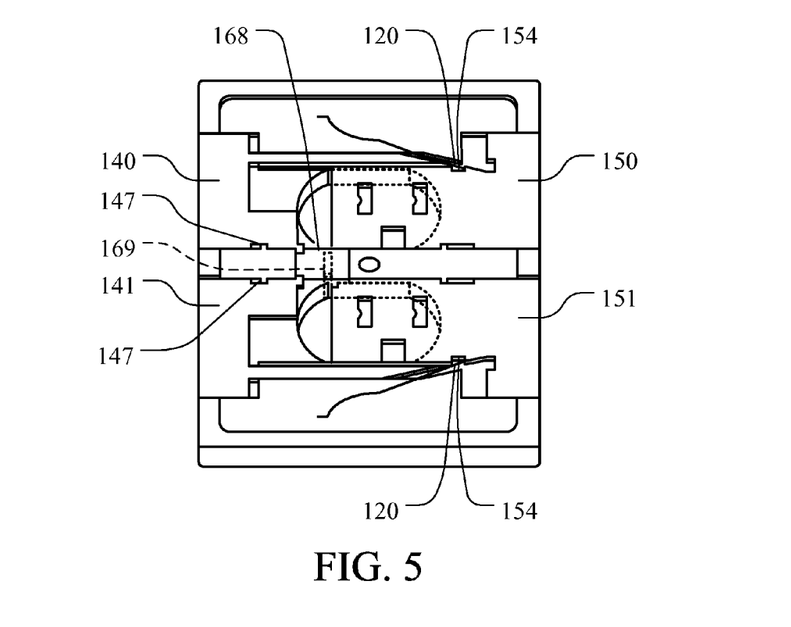
FIG. 5 is a schematic illustrating an exemplary embodiment of the present invention not properly installed.

With reference to FIG. 5, safety lock 168 is in a down position, as opposed to the up position demonstrated in FIGS. 2-4. The prong 169 of the safety lock 168 presses against the electrical outlet. As the outlet cover 100 is screwed onto the outlet, the outlet presses against the prong 169 and the safety lock is raised. If the outlet cover 100 is not screwed in far enough, the safety lock won't be raised high enough for the electrical outlet cover to be in the "open" position. As shown in FIG. 5, release slide locks 147 are pressed against the safety lock 168. Thus, the release slides 140 and 141 can't be moved. If the outlet cover 100 is screwed in far enough, as shown in FIGS. 2-4, the safety lock is raised and won't block the slides 140 and 141 from moving via the release slide locks 147.

Figure 6:
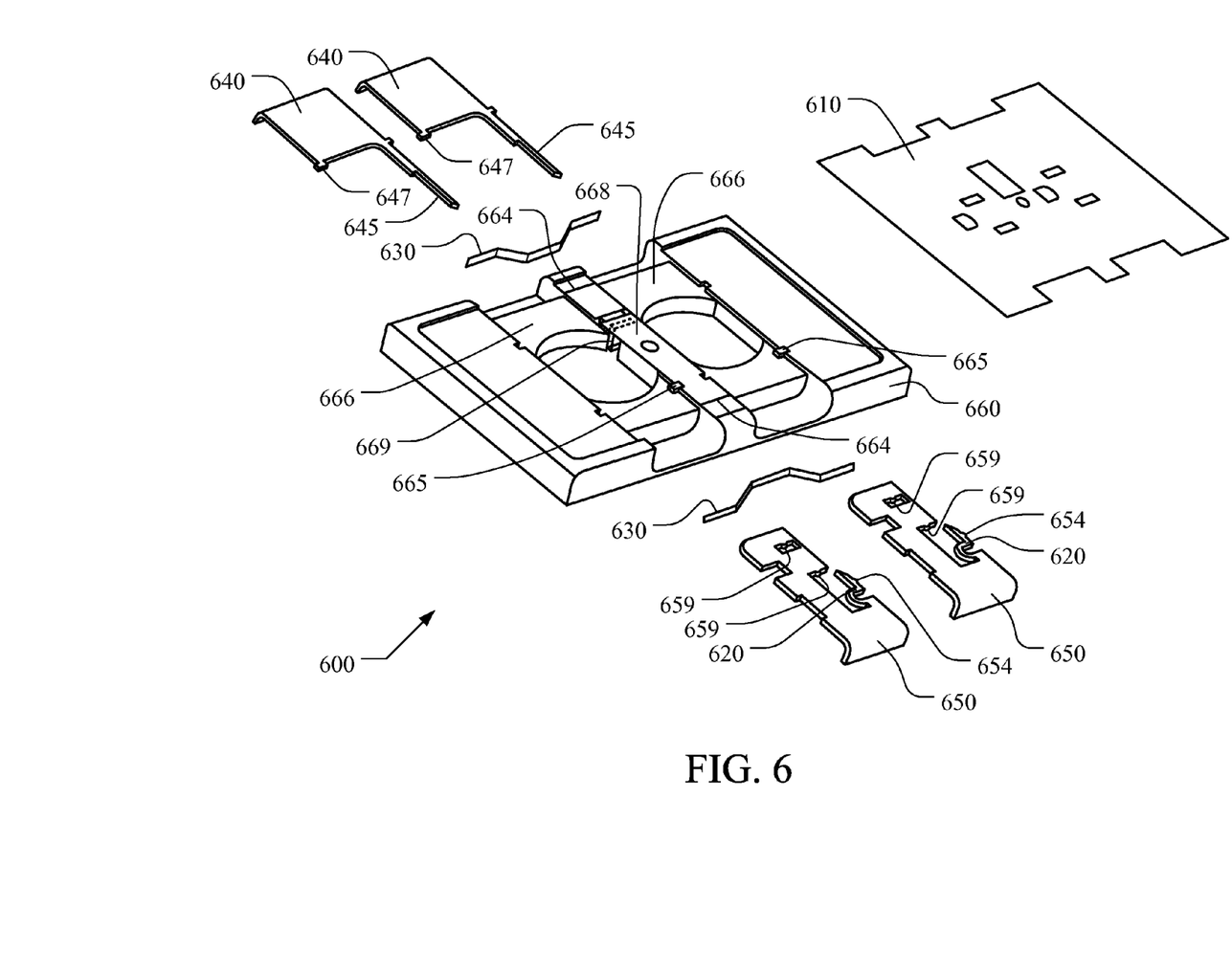
FIG. 6 is a schematic illustrating components of an exemplary embodiment in accordance with the present invention.

Another exemplary embodiment of the present invention is shown in FIG. 6. FIG. 6 shows the different components of another exemplary electrical outlet cover in accordance with aspects of the present invention. The embodiment shown in FIG. 6 comprises a face plate 610, a base 660, two return springs 630, two release slides 640, and two receptacle slides 650.

The base 660 comprises, return spring channels 664, locking channels 665, slide channels 666, and safety lock 668.

During assembly of the exemplary embodiment of the present invention shown in FIG. 6, return springs 630 are positioned in the return spring channels 664. Release slides 640 are placed into the slide channels 666 on one side of the base 660. The receptacle slides 650 are placed in the slide channels 666 on the opposite side of the base. The receptacle slides 650 should be placed on the side of the base 660 where the locking channels 665 are located. This is demonstrated in FIG. 6. Face plate 610 will rest on top of the base 660 and all of the other corresponding elements.

Figure 7:
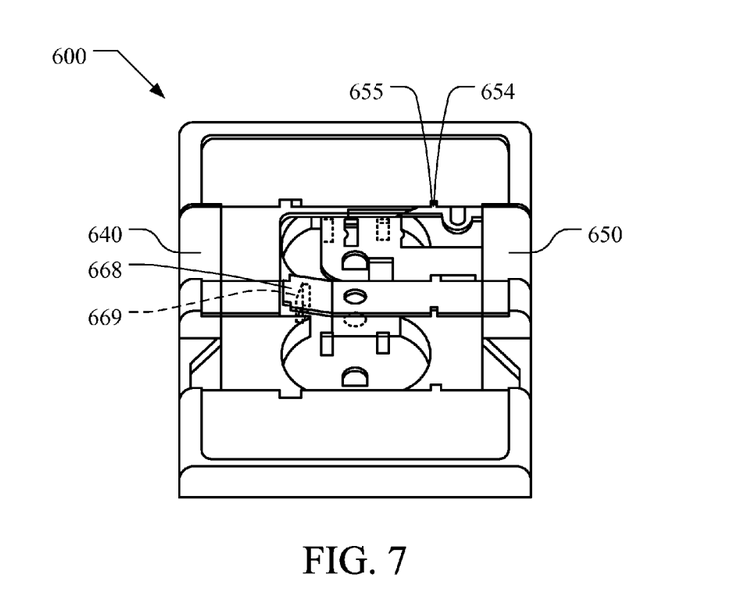
FIG. 7 is a schematic illustrating an exemplary embodiment of the present invention properly installed.

FIG. 7 shows an exemplary embodiment of the components described above assembled to make outlet cover 600. When the outlet cover 600 is assembled, the holes for the prongs on the electrical outlet will be covered by the electrical outlet cover 600. As seen in this closed position, locking springs 620, located on the receptacle slides 650 in this embodiment, prevent the receptacle slides 650 from moving and then allowing the prong holes in the electrical outlet to become exposed. The locking tabs 654 should be positioned so that they are located in the locking channels 665. When the locking tab 654 is placed within the locking channel 665, the slide to which the locking tab belongs is not able to move. Therefore, the electrical outlet is effectively "closed".

Figure 8:
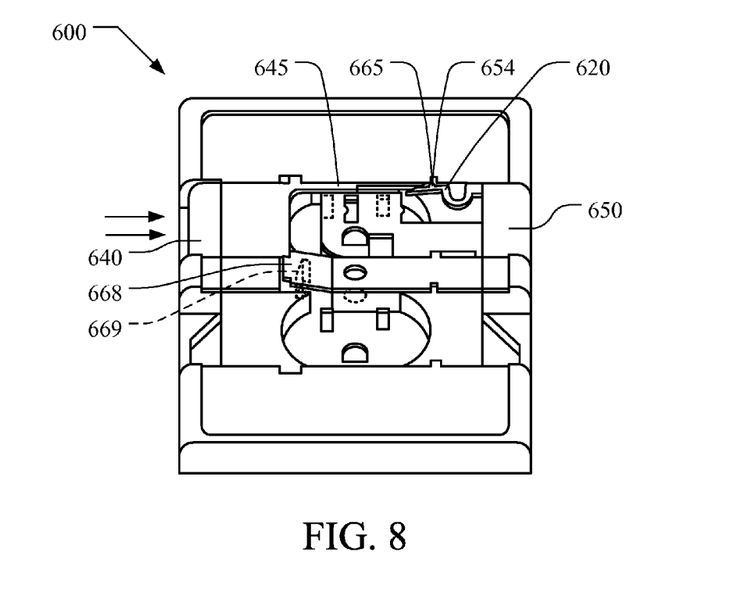
FIG. 8 is a schematic illustrating an exemplary embodiment of the present invention properly installed in use.

With reference to FIG. 8, to open the outlet cover an individual must press the side of the outlet cover with release slides 640 first, as indicated by the arrows. That person should press on the release slides 640 directly. By pressing on the release slides 640, the release prongs 645 press against the locking springs 620. This force lifts the locking springs, thereby removing the locking tab 654 from the locking channel 665. This is demonstrated in FIG. 8.

Figure 9:
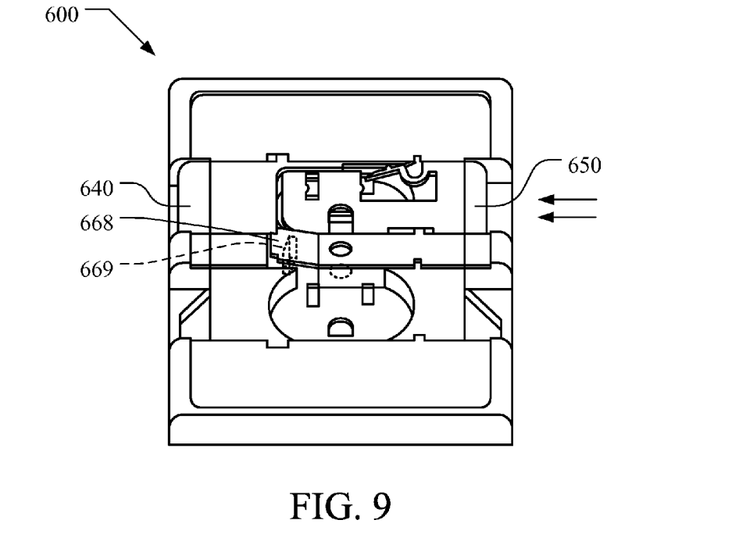
FIG. 9 is a schematic illustrating an exemplary embodiment of the present invention properly installed in use.
Figure 10:
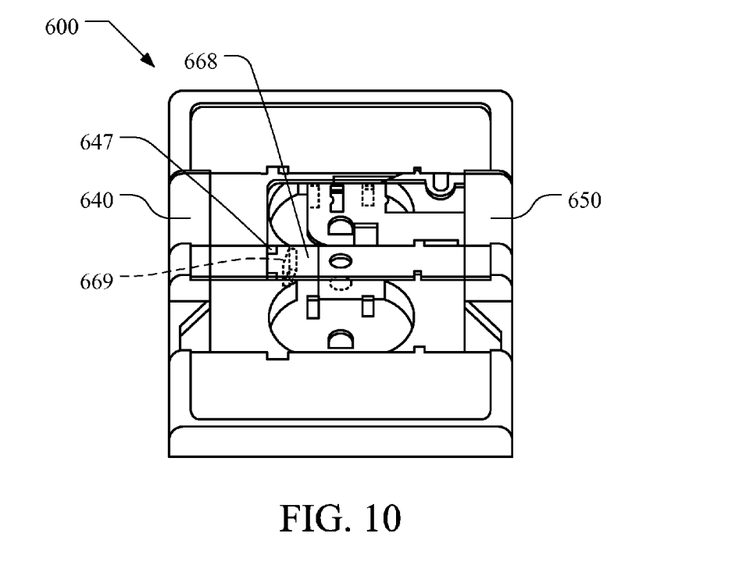
FIG. 10 is a schematic illustrating an exemplary embodiment of the present invention not properly installed.

With the locking tab 654 out of the channel 665, the receptacle slides 650 are free to move. The user should then press on the receptacle slides 650 while still pressing the release slides 640. The receptacle slides will then move into the outlet cover, revealing the prong holes of the electrical outlet. The user will then be able to plug the electrical plug into the outlet. This is demonstrated in FIG. 9.

The exemplary embodiment illustrated in FIGS. 6-9 may also comprise a safety lock 668 to ensure proper installation of the electrical outlet cover 600. The electrical outlet will press against the prong 669 of the safety lock 668. Once the safety lock 668 is lifted high enough, the release slides 640 will be able to move. If the safety lock is not lifted high enough (indicated that the cover is not properly installed) blocks 647 will but up against safety lock 668 and the release slides will not be able to move.

Figure 11:
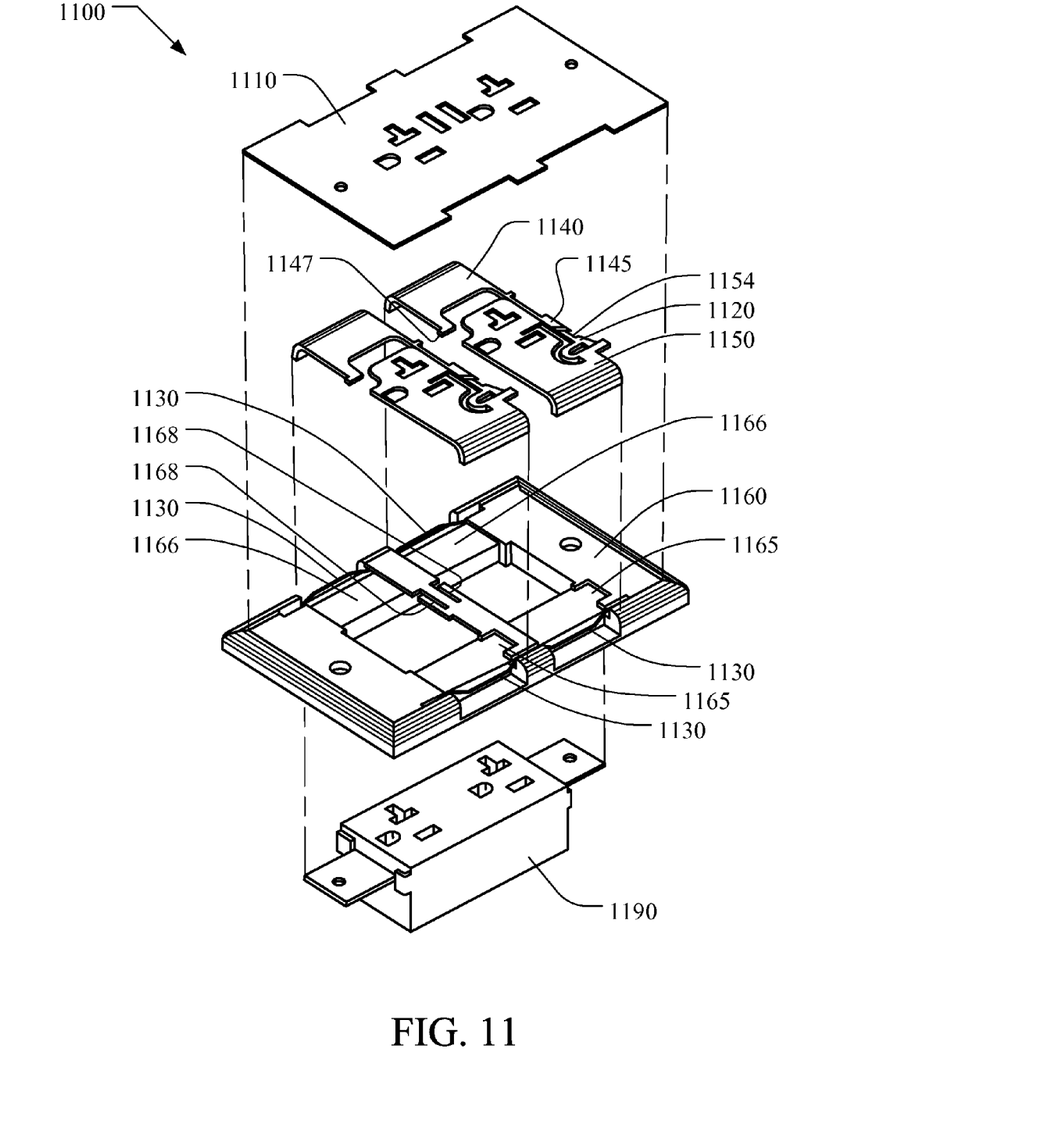
FIG. 11 is a schematic illustrating components of an exemplary embodiment in accordance with the present invention.

It should be noted that the present invention may also be used for other types of electrical outlets. For example, FIG. 11 shows the an electrical outlet cover for use with decora type outlets. The embodiment shown in FIG. 11, which is similar to that shown in FIG. 6, comprises a face plate 1110, a base 1160, return springs 1130, two release slides 1140, and two receptacle slides 1150.

The base 1160 comprises, return spring channels 1164, locking channels 1165, slide channels 1166, and safety locks 1168.

During assembly of the exemplary embodiment of the present invention shown in FIG. 11, return springs 1130 are positioned in the return spring channels 1164. Release slides 1140 are placed into the slide channels 1166 on one side of the base 1160. The receptacle slides 1150 are placed in the slide channels 1166 on the opposite side of the base. The receptacle slides 1150 should be placed on the side of the base 1160 where the locking channels 1165 are located. This is demonstrated in FIG. 12. Face plate 1110 will rest on top of the base 1160 and all of the other corresponding elements.

To open the outlet cover an individual must press the side of the outlet cover with release slides 1140 first. That person should press on the release slides 1140 directly. By pressing on the release slides 1140, the release prongs 1145 press against the locking springs 1120. This force lifts the locking springs, thereby removing the locking tab 1154 from the locking channel 1165.

With the locking tab 1154 out of the channel 1165, the receptacle slides 1150 are free to move. The user should then press on the receptacle slides 1150 while still pressing the release slides 1140. The receptacle slides will then move into the outlet cover, revealing the prong holes of the electrical outlet. The user will then be able to plug the electrical plug into the outlet.

Similarly to the embodiments describe above, electrical outlet cover 1100 may comprise safety locks 1168. The electrical outlet will press against the prongs 1169 of the safety locks 1168. The force of the outlet pressing on the prongs 1169 will lift the safety locks higher. Once the safety lock 1168 is lifted high enough, the release slides 1140 will be able to move. If the safety locks are not lifted high enough (indicated that the cover is not properly installed) blocks 1147 will but up against safety locks 1168 and the release slides will not be able to move.

In addition, an electrical outlet cover according to aspects of the present invention may comprise locking pins. For example, with reference to FIG. 1, locking pins 159 are present on receptacle slides 150 and 151. Similarly in FIG. 6, demonstrates locking pins 659. Locking pins 159 will lock into a hole at the base of a power prong with assistance from force applied by the return springs 130. Once a plug is inserted in the outlet and locked, a child will be unable to remove the plug or a portion of it from the outlet. To remove a plug once it is locked, a user should slightly press slides 140 and 150. After the plug is removed the spring action will move the slides back to the "closed" position. In one exemplary embodiment, the locking tabs may be flexible, thereby allowing the plug to be pulled out quickly in an emergency. This quick release mechanism will keep the plug locked into the receptacle until the plug is pulled with some predetermined amount of force, such as, for example 15 lbs. The amount of force required to activate the quick-release mechanism can be changed (for O.S.H.A. standards, for example.) The size and material of the locking pins can be adjusted to change the force required to activate the quick-release mechanism.

Figure 12:
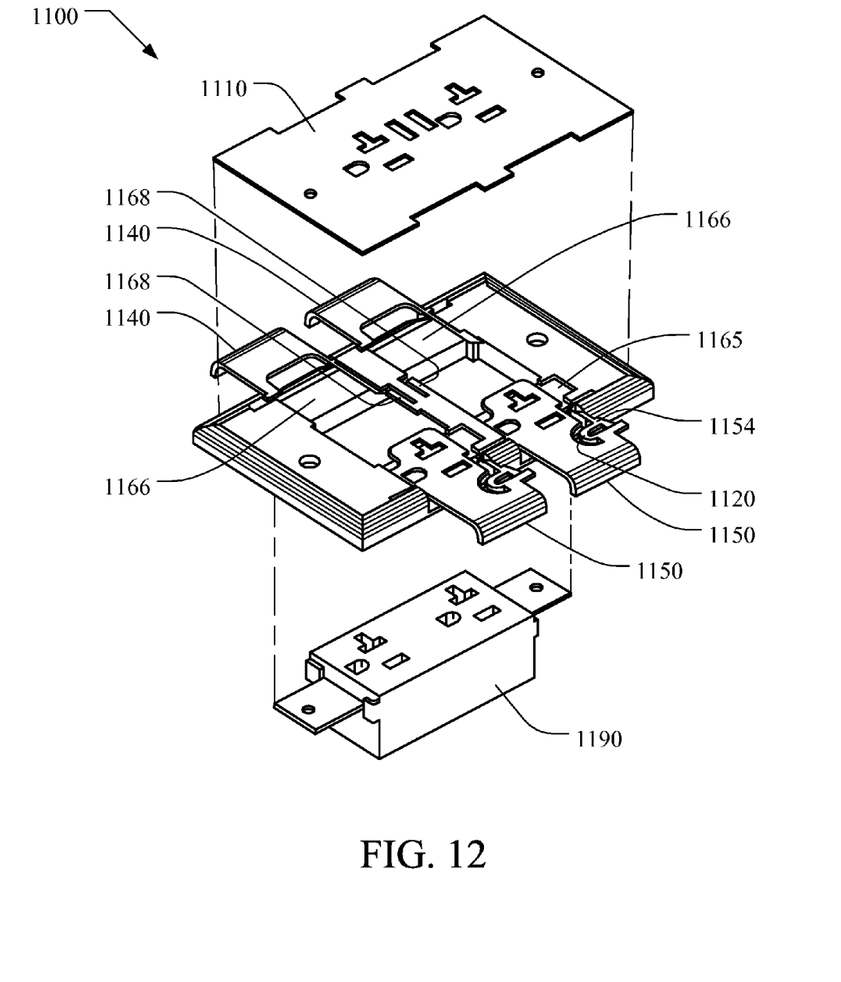
FIG. 12 is a schematic illustrating components of an exemplary embodiment in accordance with the present invention.
Figure 13:
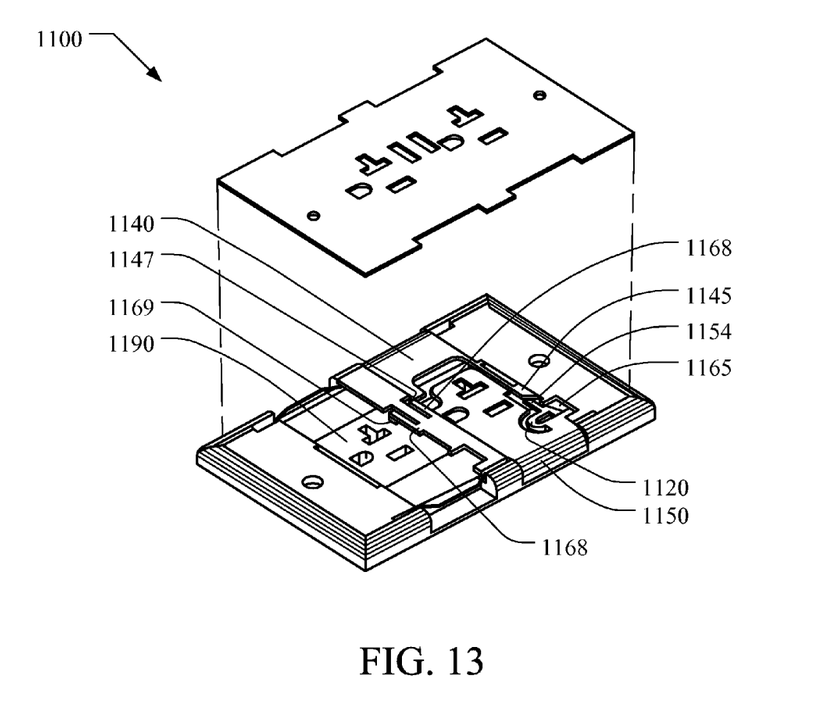
FIG. 13 is a schematic illustrating components of an exemplary embodiment in accordance with the present invention.

In yet another embodiment of the present invention, the electrical outlet covers described above may also comprise an electrical outlet, therefore forming a single unit that comprises a electrical outlet with a safety cover. In accordance with aspects of this embodiment, the base will be attached to the outlet, thus ensuring that the installation of the electrical outlet cover is done properly. For example, with reference to FIGS. 11-13, electrical outlet cover 1100 may also comprise electrical outlet 1190. As shown in FIGS. 12 and 13, the outlet 1160 is inserted into base 1160 and is attached thereto. The face plate 1110 covers the base/electrical outlet combination to form the single unit. The electrical outlet with safety cover is then wired and attached directly to the handy box, where it is ready to be used.

Although, the electrical cover should be properly installed to the electrical outlet in this particular embodiment, the electrical outlet cover 1100 may still comprise safety locks 1168. It should be noted that any of the embodiments previously discussed may also comprise an electrical outlet to form a single unit that comprises an electrical outlet with safety cover.

Although several preferred embodiments of the present invention have been described in detail herein, it is to be understood that the invention in not limited to these precise embodiments, and that various changes and modifications may be made by one skilled in the art without departing from the scope or spirit of the invention.

What is claimed is:

1. An electrical outlet cover apparatus comprising:
a base to be attached to an electrical outlet;
at least one release slide; and
at least one receptacle slide;
wherein the at least one receptacle slide has apertures; and
wherein the at least one release slide, when pressed, causes a release prong of said at least one release slide to advance laterally until said release prong unlocks the at least one receptacle slide, allowing the at least one receptacle slide to move into position where the apertures of the at least one receptacle slide allow access to the apertures of the electrical outlet.

2. The electrical outlet cover apparatus of claim 1, further comprising a safety lock.

3. The electrical outlet cover apparatus of claim 2, further comprising a prong, said prong pressing against said electrical outlet, said prong displacing said safety lock during installation of said base, wherein the at least one release slide and the at least one receptacle slide become immobilized by said safety lock after an improper installation.

4. The electrical outlet cover apparatus of claim 1, wherein the release prong engages a locking spring when the at least one release slide is pressed.

5. The electrical outlet cover apparatus of claim 4, wherein the at least one receptacle slide becomes unlocked when the release prong engages the locking spring.

6. The electrical outlet cover apparatus of claim 1, further comprising return springs that will return the at least one release slide and at least one receptacle slide to their respective ambient positions when they are not pressed and there is no plug inserted into the apertures of the electrical outlet.

7. The electrical outlet cover apparatus of claim 1, wherein the apertures on the at least one receptacle slide comprise locking pins to engage with prongs from a plug inserted into the electrical outlet.

8. An electrical outlet cover apparatus comprising:
a base to be attached to an electrical outlet;
at least one receptacle slide that blocks a plurality of apertures the electrical outlet;

a safety lock having a prong, said electrical outlet pressing against the prong to raise the safety lock high enough or to move it aside laterally to ensure proper installation of the electrical outlet cover.

9. The electrical outlet cover apparatus of claim 8, further comprising at least one release slide corresponding to the at least one receptacle slide.

10. The electrical outlet cover apparatus of claim 9, wherein the at least one release slide when pressed, causes a release prong of said at least one release slide to advance laterally until said release prong unlocks the at least one receptacle slide, allowing the at least one receptacle slide to move into position where the apertures of the at least one receptacle slide allow access to the apertures of the electrical outlet.

11. The electrical outlet cover apparatus of claim 10, wherein the safety lock blocks the at least one release slide from moving and unlocking the at least one slide that blocks the electrical outlet when the electrical outlet cover is not properly installed.

12. The electrical outlet cover apparatus of claim 8, wherein said receptacle slide further comprises locking pins to engage with prongs from a plug that is inserted into the apertures of the electrical outlet, said locking pins making removal of said plug from said electrical outlet more difficult.

13. The electrical outlet cover apparatus of claim 8, wherein said at least one release slide further comprises release slide safety locks, said release slide safety locks being inserted into said safety lock while said safety lock is in locked position.

14. A method of blocking access to an electrical outlet comprising the steps of:
- providing an electrical outlet cover that covers the electrical outlet;
- said electrical cover having at least one release slide, said release slide having a prong that unlocks at least one receptacle slide;
- the step of revealing a plurality of apertures of the electrical outlet when both the at least one release side and the at least one receptacle slide of the outlet cover are pressed; and
- a step of using a safety lock to prevent access to the electrical outlet when the electrical outlet cover is improperly installed, said safety lock having a prong, said electrical outlet pressing against the prong to displace the safety lock, wherein improper installation causes inadequate displacement of the safety lock that immobilizes the at least one release slide and the at the least one receptacle slide.

15. The method of claim 14, further comprising a step of locking prongs of a plug that is inserted into the apertures of the electrical outlet with a plurality of locking pins, said locking pins located within at least one aperture of the receptacle slides.

16. The method of claim 14, further comprising a step wherein the release slide of the electrical outlet cover must be pressed before the receptacle slide of the electrical outlet cover before the apertures of the electrical outlet are revealed.

* * * * *